(12) United States Patent
Nakazato et al.

(10) Patent No.: US 9,182,221 B2
(45) Date of Patent: Nov. 10, 2015

(54) INFORMATION PROCESSING APPARATUS AND INFORMATION PROCESSING METHOD

(75) Inventors: Yusuke Nakazato, Tokyo (JP); Shinji Uchiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 696 days.

(21) Appl. No.: 13/493,344

(22) Filed: Jun. 11, 2012

(65) Prior Publication Data

US 2012/0316820 A1 Dec. 13, 2012

(30) Foreign Application Priority Data

Jun. 13, 2011 (JP) .................................. 2011-131499

(51) Int. Cl.
*G06F 19/00* (2011.01)
*G01B 11/25* (2006.01)

(52) U.S. Cl.
CPC ...................................... *G01B 11/25* (2013.01)

(58) Field of Classification Search
CPC .......... G01B 11/24; G01B 11/25; G01B 11/26
USPC ................ 356/620; 901/2; 382/103
See application file for complete search history.

(56) References Cited

U.S. PATENT DOCUMENTS

2008/0130015 A1  6/2008 Lu
2010/0289797 A1* 11/2010 Tateno et al. .................. 345/419
2010/0328682 A1* 12/2010 Kotake et al. .................. 356/620

FOREIGN PATENT DOCUMENTS

CN           1651858 A      8/2005
WO       2011/013301 A1   2/2011

OTHER PUBLICATIONS

Johnson et al., "Using Spin Images for Efficient Object Recognition in Cluttered 3D Scenes," IEEE Transactions on Pattern Analysis and Machine Intelligence, May 1999, pp. 433-449, vol. 21, No. 5.
Gupta et al., "(DE) Focusing on Global Light Transport for Active Scene Recovery," IEEE Computer Vision and Pattern Recognition, 2009, pp. 1-8.
Besl et al., "A Method for Registration of 3-D Shapes," IEEE Transactions on Pattern Analysis and Machine intelligence, Feb. 1992, pp. 239-256, vol. 14, No. 2.
Jensen et al., "A Practical Model for Subsurface Light Transport," SIGGRAPH '01: Proceedings of the 28th Annual Conference on Computer Graphics and Interactive Techniques, 2001, pp. 511-518.
Jin Gang; "Study on Theories and Technologies of Three-dimensional Information Acquisition in Three-dimensional Scanner"; Nov. 15, 2006; pp. 1, 23, 24, 27, 39-42, 63-69, 92, 97, 98, 105.

* cited by examiner

*Primary Examiner* — John Breene
*Assistant Examiner* — Hien Vo
(74) *Attorney, Agent, or Firm* — Canon USA Inc. IP Division

(57) ABSTRACT

An information processing apparatus includes an acquisition unit configured to acquire a plurality of positions on a surface of a measurement target object using information of light reflected from the measurement target object on which structured light is projected, a position of a light source of the structured light, and a position of a light reception unit configured to receive the reflected light and acquire the information of the reflected light, a calculation unit configured to acquire at least one of a position and a direction on the surface of the measurement target object based on the plurality of the positions, and a correction unit configured to correct at least one of the plurality of the positions based on information about an error in measurement for acquiring the plurality of the positions and at least one of the position and the direction on the surface of the measurement target object.

15 Claims, 8 Drawing Sheets

CASE OF SEMI-TRANSPARENT OBJECT

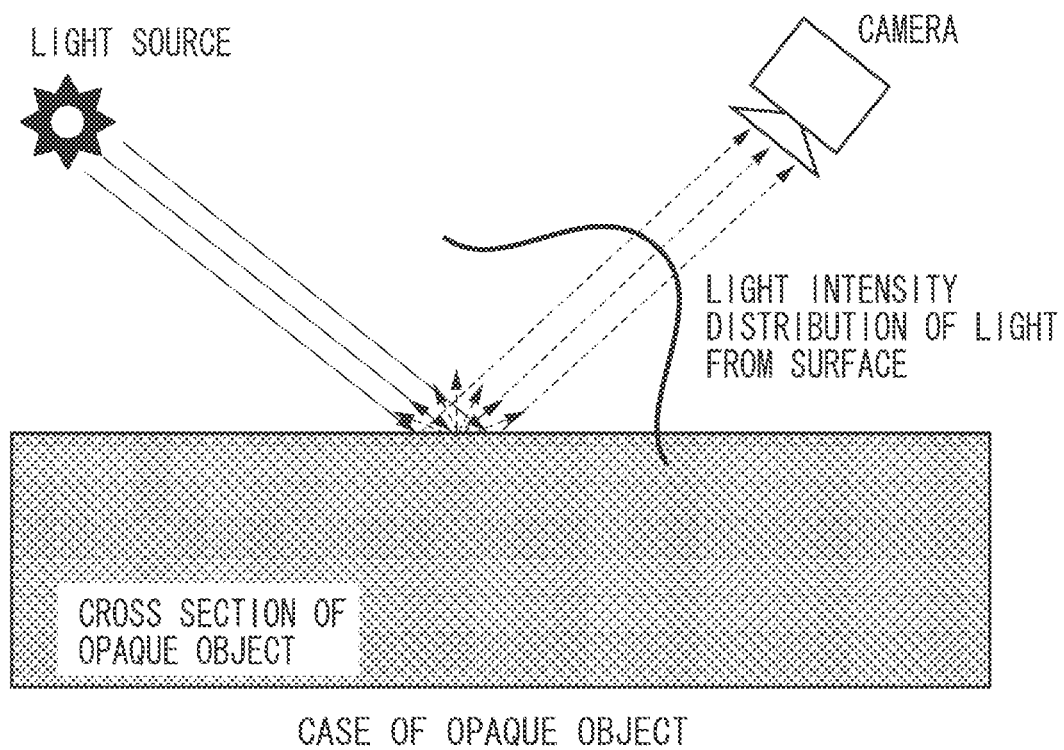

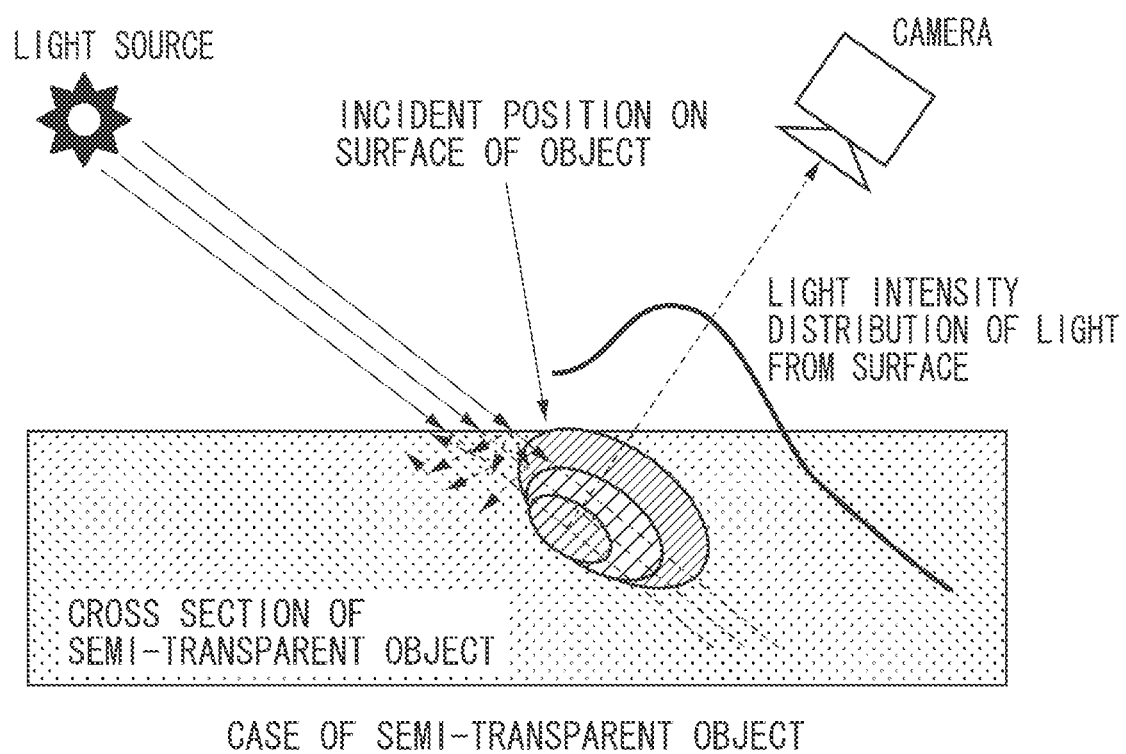

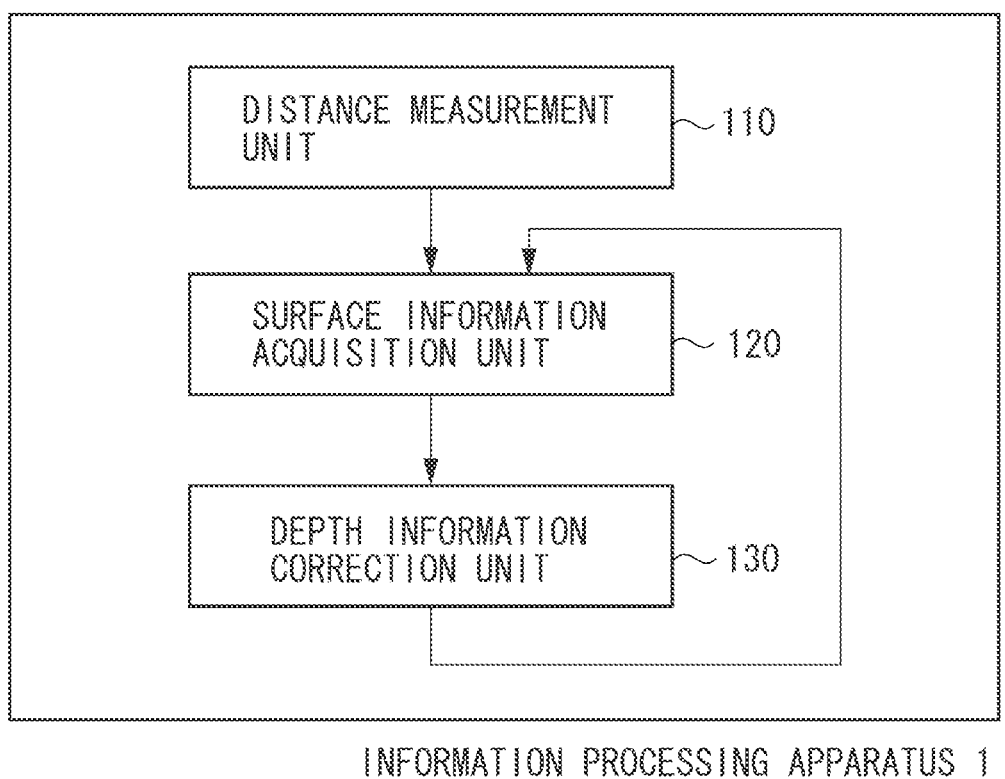

INFORMATION PROCESSING APPARATUS AND INFORMATION PROCESSING METHOD

BACKGROUND OF THE INVENTION

1. Field of the Invention

The present invention relates to an information processing apparatus for performing three-dimensional measurement on a measurement target object, and an information processing method.

2. Description of the Related Art

For measurement of a shape, a position, and an orientation of an object to be measured in a three-dimensional space, a measurement apparatus for measuring depth information of a surface of the object to be measured with respect to an imaging apparatus has been provided. Especially, in a non-contact type measurement apparatus, methods for measuring depth information to a measurement target by analyzing reflected light of light emitted onto the measurement target are widely used.

The measuring methods include, for example, a light-section method and a spatial coding method in which an imaging apparatus (camera) captures an image of a measurement target onto which known structured light is projected, and depth information is calculated using a trigonometric method from the light source position, the camera position, and the pattern position on the captured image. Further, the methods for calculating the position and orientation of the measurement target often uses a method for fitting a shape model of the measurement target to depth information or a two-dimensional image.

A position and orientation measurement method by model fitting is discussed in a document 1, P. J. Besl and N. D. Mckay, "A Method for Registration of 3-D Shapes", IEEE Transactions on Pattern Analysis and Machine Intelligence, Vol. 14, No. 2, pp. 239-256, 1992. In the method discussed in the document 1, the position and orientation of an object are estimated by performing nearest neighbor search on correspondence of measurement points acquired from depth information and a shape model surface, and minimizing the corresponding distances.

However, when a user acquires the depth information (three-dimensional position) of the measurement target according to the above-described conventional method, the acquirement accuracy of the depth information may decrease depending on various conditions.

For example, it is assumed that a receiving unit receives reflected light of structured light projected onto a measurement target, and the depth information is measured using a trigonometric method. In such a case, if the target object is a semi-transparent object made of a material containing plastic or wax, the light scatters in the target object (i.e., subsurface scattering). Due to the subsurface scattering, the projection light is measured at a position deviating from the projection position. As a result, the distance value different from a true distance value is measured.

In another case, if the measurement target object is a material which causes anisotropic reflection such as mica, metal, shiny fiber, or the like, the accuracy in the depth information acquisition may be decreased due to the anisotropic reflection. Further, depending on the calibration accuracy of a camera (imaging apparatus), the depth information acquisition accuracy may decrease.

To deal with the subsurface scattering, a method is discussed in the document 2, M. Gupta, Y. Tian, S. G. Narasimhan, and L. Zhang, "(De) Focusing on Global Light Transport for Active Scene Recovery", IEEE Computer Vision and Pattern Recognition (CVPR) 2009. In the method, using a phenomenon in which a high-frequency pattern is attenuated due to subsurface scattering, a projection pattern in a phase shift method is converted into a high-frequency pattern.

By the method discussed in the document 2, a distance value can be measured while effects due to indirect reflection components such as the subsurface scattering are reduced. However, such a method takes time for the measurement because a plurality of times of projection of high-frequency patterns by shifting phases is required in addition to projection of a pattern minimum required to the distance measurement. Moreover, in the method discussed in the document 2, if an object to be measured may have a subsurface scattering characteristic, the object is measured using scatter components on the surface, so that the information of the subsurface scattering is not used.

SUMMARY OF THE INVENTION

The present invention is directed to preventing the decline in the accuracy of the three-dimensional position acquisition of a measurement target object due to a measurement error in a method for performing three-dimensional measurement using reflected light from the measurement target object.

According to an aspect of the present invention, an information processing apparatus includes an acquisition unit configured to acquire a plurality of positions on a surface of a measurement target object using information of light reflected from the measurement target object on which structured light is projected, a position of a light source of the structured light, and a position of a light reception unit configured to receive the reflected light and acquire the information of the reflected light, a calculation unit configured to acquire at least one of a position and a direction on the surface of the measurement target object based on the plurality of the positions, and a correction unit configured to correct at least one of the plurality of the positions based on information about an error in measurement for acquiring the plurality of the positions and at least one of the position and the direction on the surface of the measurement target object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 1A and 1B are conceptual diagrams illustrating depth information acquisition of a semi-transparent object.

FIG. 2 illustrates a configuration of an information processing apparatus according to a first exemplary embodiment of the present invention.

DESCRIPTION OF THE EMBODIMENTS

Figure 3:
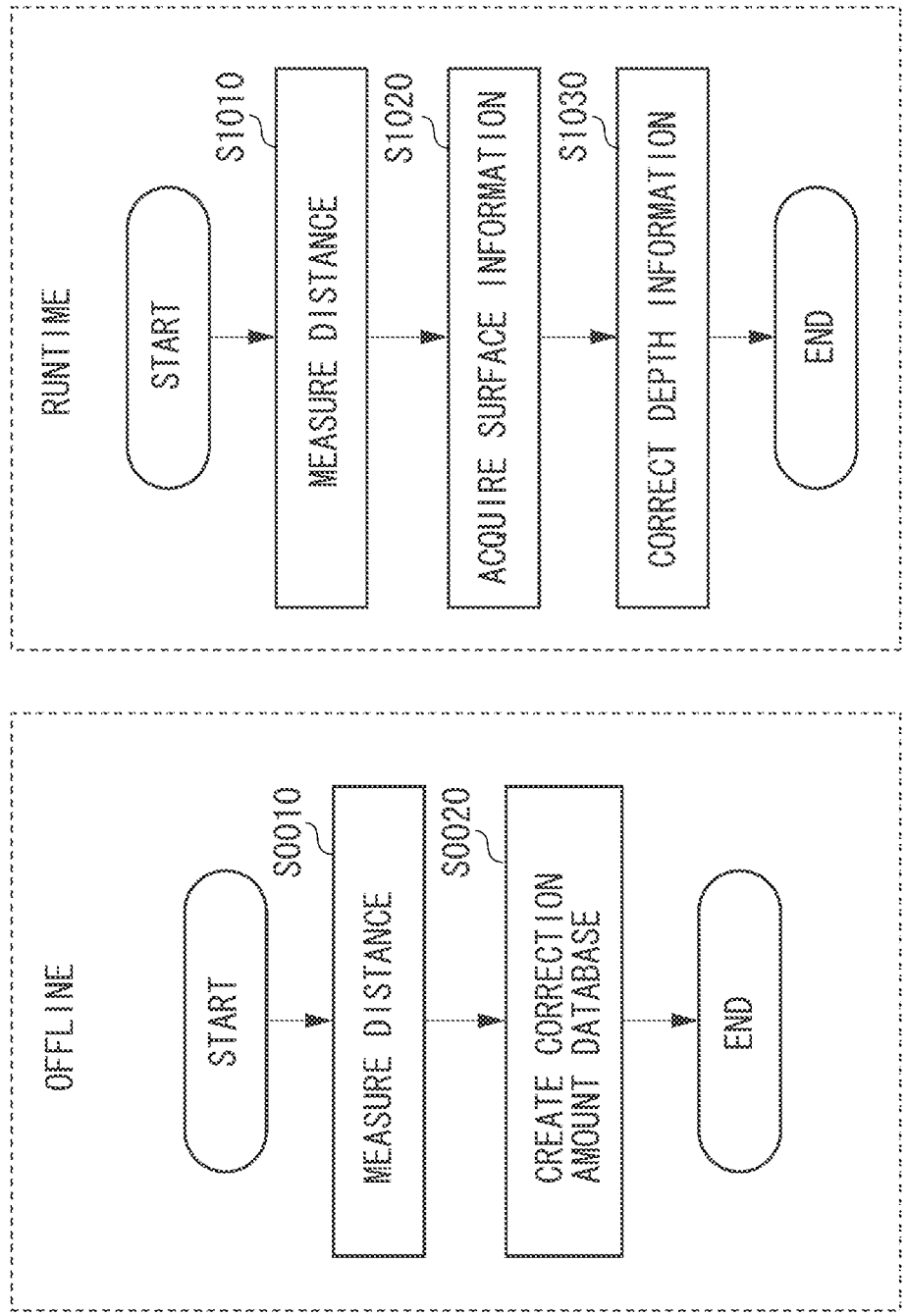
FIG. 3 is a flowchart illustrating a procedure in depth information correction processing according to the first exemplary embodiment.

Various exemplary embodiments, features, and aspects of the invention will be described in detail below with reference to the drawings.

In a first exemplary embodiment, structured light is projected onto a measurement target object from a light source, and reflected light from the measurement target object is received by a light reception unit. Depth information from the light reception unit to the measurement target object can be acquired from information of the reflected light received by the light reception unit using a trigonometric method. The acquired depth information is corrected based on a position and a direction of a surface of the measurement target object.

In the above-described depth information calculation method using the trigonometric method, as in the conceptual diagram illustrated in FIG. 1A, it is assumed that the light reflected on the surface of the measurement target object is basically received by the light reception unit.

However, in a case where the measurement target object is a semi-transparent object as illustrated in FIG. 1B, the light projected from the light source penetrates and scatters in the object. As a result, the light comes out from the object and the light reflected on the surface of the object are observed. Such a phenomenon is referred to as subsurface scattering.

In the subsurface scattering, according to the material of the object, the light scatters in the direction that the light proceeds or scatters in the opposite direction. Therefore, the luminance distribution of the light received by the light reception unit differs from that of when the light is reflected only on the surface of the object, and a peak point in the luminance distribution may be deviated or the distribution may not be isotropic. In such a case, an observation position deviates from the light projection position and a position different from the object surface is measured as the depth information.

The occurrence of the subsurface scattering of the measurement target object is described above as one of the causes of the decrease in the depth information acquisition accuracy. However, the other causes of the decrease in the depth information acquisition accuracy include occurrence of anisotropic reflection on the measurement target object. In addition, the decrease in the depth information acquisition accuracy may be caused by calibration accuracy of the camera (imaging unit).

To deal with the error in the depth information acquisition, the exemplary embodiment of the present invention is focused on a fact that the error in the depth information acquisition depends on the positions and the orientations of the light source and the light reception unit, and the position and the direction of the surface of the measurement target object. In other words, a correction amount of a position of a measurement point is acquired from a relationship between information about errors in the measurement (optical characteristics such as subsurface scattering and anisotropic reflection, and calibration accuracy) and an inclination of the surface of the measurement target object.

More specifically, correction amounts corresponding to the positions and orientations of the light source and the light reception unit, and positions and directions of arbitrary points of the target object are stored in a database (look-up table) in advance. By using the position and the orientation of the measurement point calculated from the measured depth information as a key, the depth information is corrected using the correction amount extracted from the database.

FIG. 2 illustrates a configuration of an information processing apparatus 1 according to the present exemplary embodiment. As illustrated in FIG. 2, the information processing apparatus 1 includes a distance measurement unit 110, a surface information acquisition unit 120, and a depth information correction unit 130. Hereinafter, the components in the information processing apparatus 1 are described.

The distance measurement unit 110 functions as a first acquisition unit. The distance measurement unit 110 acquires depth information of a measurement target object using a trigonometric method from a result of reception of light reflected from the measurement target object by the light reception unit. The reflected light is acquired by projecting structured light onto the measurement target object. The structured light is projected to the measurement target object to calculate a shape, a position, and an orientation of the measurement target object to be used in a light-section method, a spatial coding method, and the like.

In the present exemplary embodiment, a slit light beam is used as the structured light, and a camera is used as the light reception unit. The different slit light beams and images corresponding to the light beams are captured in a plurality of times, and a distance image is formed therefrom using the light-section method. The distance measurement method is not limited to the above-described method. Any method based on the trigonometric method such as a spatial coding method, a spot light projection method, or a pattern projection method can be employed.

Consequently, any types of structured light, such as pattern light or spot light, can be used as long as it can specify a position of a light source. In the spatial coding method, for example, pattern light of negative/positive inversion is projected, from a difference between an image acquired by projecting a negative pattern and an image acquired by projecting a positive pattern, an intersection point on which the large and small of luminance values of these images are inverted is detected, and the depth information is calculated using the trigonometric method. Even in this calculation, if the target object is semi-transparent, the position of the intersection point deviates because the received luminance distribution is not isotropic, and as a result, the calculated depth information includes errors. In the spot light projection method, similarly to the light-section method, a projected position on the surface of the object deviates from an observation position.

The reception unit is not limited to the camera. Any mechanism, such as a photodiode having a slit for detecting a direction of incident light, capable of detecting projected light and the direction of the light can be employed.

If the measurement target object is a semi-transparent object (object which largely causes subsurface scattering), different from the above-described case in which the light is reflected only on the surface of the object, a peak point in the luminance distribution deviates or the distribution is not isotropic.

In the light-section method, a position of the projected slit light is detected from the image captured by the camera, and the depth information is calculated using the trigonometric method. The slit light has a predetermined width, and the captured image is binarized and the center of the slit light region is used as an observation position of the slit light. In the case of the semi-transparent object, the luminance distribution of the received light is not isotropic. As a result, the central position of the observed slit light deviates, and the calculated depth information includes errors.

In addition, in a case where the observation position of the slit light is not set at the central position but set at a peak position of the slit light in the captured image, the peak position is observed at a position deviated from the surface of the object. Thus, the calculated depth information includes errors. The errors are corrected by the depth information correction unit 130 which is described below.

The surface information acquisition unit 120 functions as a second acquisition unit. The surface information acquisition unit 120 calculates the depth information, that is the position and direction of the measurement point of the target object acquired by the distance measurement unit 110. The distance measurement provides a three-dimensional position of the measurement point. The slope of the measurement point is equivalent to the normal direction of the measurement point.

The normal direction of the measurement point can be calculated by performing a principal component analysis with respect to a target measurement point and neighbor measurement points, and defining a third main component as the normal direction. Alternatively, by performing surface fitting to positions of the target measurement point and the neighbor measurement points, the normal direction can be calculated. The method of expressing the direction is not limited to the normal line vector as long as the direction of the measurement point is expressed, and alternatively, two vectors orthogonal to the normal line can be employed.

The depth information correction unit 130 corrects the depth information, that is, the three-dimensional position of the measurement point based on the measurement point group of the target object acquired by the distance measurement unit 110, the directions of the individual measurement points acquired by the surface information acquisition unit 120, and the positions and the orientations of the light source and the light reception unit in the distance measurement unit 110.

In reality, the relative positions and orientations of the light source and the camera are already defined by calibration. Accordingly, a correction amount corresponding to the position and direction of the measurement point is extracted from the correction amount database provided in advance, and the correction amount is added to the three-dimensional position of the measurement point to correct the depth information, and the corrected data is output. The method for creating the correction amount database is described with reference to the flowchart described below.

In the extraction of the correction amount from the database, if positions and orientations of points are close, the correction values are close too. Consequently, if the position and the direction of a key point do not exist in the correction amount database, the correction amount can be calculated by interpolating from correction amounts of points having close positions and orientations. Alternatively, the position and orientation and the correction amount of the point may be put into a polynomial or a trigonometric function as parameters to generate a correction function for returning a correction amount using the position and orientation of the point as arguments, and the value may be used.

The values to be input in the correction amount database or in the use of the correction function are the position and direction of an arbitrary point acquired by the surface information acquisition unit 120. Accordingly, the key or the argument used in the creation of the correction amount database or the correction function may be a position and a direction of a point calculated from a measurement point considering effects due to subsurface scattering, not the original position and direction of an arbitrary point of the target object.

Hereinafter, the depth information correction method according to the present exemplary embodiment is described with reference to the flowcharts in FIG. 3. The left flowchart in FIG. 3 illustrates processing for creating the correction amount database in off-line processing. The right flowchart in FIG. 3 illustrates processing for correcting the depth information in run-time processing. With reference to the left flowchart in FIG. 3, the processing for creating the above-described correction amount database is described.

In step S0010, distance measurement of the measurement target object is performed. First, the measurement target object or a member of the same material as the measurement target object is fixed on a stage whose inclination can be controlled. Then, the distance measurement unit 110 measures depth information (three-dimensional position) of the target object by variously changing positions and orientations.

Next, the measurement target object is coated so that light is scattered and reflected on the surface of the measurement target object. Then, the distance measurement unit 110 measures the depth information (three-dimensional position) of the target object by variously changing the positions and orientations under the same conditions. The measured depth information pieces are transferred to the processing in step S0020.

In step S0020, a correction amount database is created. First, with respect to an arbitrary point on the surface of the measurement target object, using the depth information measured in step S0010, a difference between the positions of the point before and after the coating is acquired and registered as a correction amount in the database. Further, the position and the orientation of the measurement target object is registered in the correction amount database as a key for the database.

In the above-described processing in step S0010, the measurement target object or the member of the same material as the measurement target object is fixed on the stage. However, the stage is not necessarily used if the position and orientation of the measurement target object or those of the member of the same material can be measured, and the positions and the orientations can be changed.

For example, if the measurement target object is fixed on a marker on which a known pattern is printed, the position and orientation of the target object can be measured from a captured image of the marker. In such a case, the position and the orientation of the marker and the measurement target object can be manually changed and the depth information can be measured. With respect to the measurement by coating the measurement target object, the coating can be omitted if the depth information of the measurement target object or the member of the same material can be measured without effects due to subsurface scattering. For example, a contact sensor can be used, or an object of the same shape and a different material can be used instead of the coated object. Further, if the measurement target object is an object having an anisotropic reflection characteristic, and the anisotropic reflection is to be corrected, an object of the same shape as the measurement target object and not having the anisotropic reflection characteristic can be used.

With reference to the right flowchart in FIG. 3, the run-time processing for correcting the depth information of the measurement target object is described. The run-time processing is executed by the individual units in FIG. 1. Alternatively, the run-time processing can be executed by a computer including a recording medium storing a computer program for implementing the processing.

In step S1010, the distance measurement unit 110 measures the depth information (three-dimensional position) of the measurement target object. The measured depth information is transferred to the processing in step S1020.

In step S1020, the surface information acquisition unit 120 calculates the position and the direction of the measurement point on the surface of the measurement target object using the depth information of the measurement target object acquired in step S1010. The calculated position and the direction of the measurement point are transferred to the processing in step S1030.

In step S1030, the depth information correction unit 130 corrects the depth information using the position and the direction of the measurement point acquired in step S1020 and the correction amount database, and outputs the data.

By the above-described processing, the errors in the depth information acquisition can be appropriately corrected, and accurate depth information can be acquired. Especially, in the case where the measurement target object largely causes the subsurface scattering, the accuracy in the depth information acquisition can be significantly increased.

In a first modification of the first exemplary embodiment, the depth information is corrected by repeating the processing in the surface information acquisition unit 120 and the depth information correction unit 130 until the directions of the measurement points are converged.

In the first exemplary embodiment, the depth information correction is performed once. However, the position and the direction of the arbitrary measurement point acquired by the surface information acquisition unit 120 are values calculated from the position of the measurement point including errors caused by the subsurface scattering. Therefore, the position and the direction acquired from such value may include errors.

To solve the issue, in the present modification, with respect to the position of the measurement point corrected by the depth information correction unit 130 in step S1030, the direction of the measurement point is calculated by the surface information acquisition unit 120 by returning to the processing in step S1020 again.

Based on the newly calculated position and direction of the measurement point, in step S1030, the depth information correction unit 130 corrects the depth information of the measurement point, that is, the three-dimensional position of the measurement point. In the present modification, in step S1020, the processing is repeated until the change in the position and the direction of the measurement point calculated by the surface information acquisition unit 120 has a value less than or equal to a predetermined threshold, and the depth information is corrected. Alternatively, the depth information pieces acquired by each repeated processing can be averaged to reduce the errors.

By the above-described processing according to the present modification, the errors in the depth information acquisition can be corrected with a high degree of accuracy, and accurate depth information can be acquired.

In a second modification of the first exemplary embodiment, a surface observation positional deviation amount is stored in the correction amount database used in the depth information correction unit 130 in the first exemplary embodiment.

In the first exemplary embodiment, with respect to the arbitrary point on the surface of the measurement target object, the difference of the positions of the measurement point in the case of the semi-transparent measurement target object and in the case of the opaque measurement target object are registered in the correction amount database and the values are used. However, the processing can be implemented without registering the correction amounts themselves in the correction amount database.

For example, a difference between a position of the structured light incident on the surface of the measurement target object and a position at which the structured light is measured, in other words, a surface observation positional deviation amount can be registered in the database and the values can be used. The surface observation positional deviation amount at an arbitrary point of the measurement target object can be acquired by calculating a difference between an observation position of the structured light on a semi-transparent object and an observation position of the structured light on an object that is made opaque by the coating.

To use the surface observation positional deviation amount, the depth information correction unit 130 acquires the surface observation positional deviation amount from the database based on the position and slope of the measurement point. The processing functions as a surface observation positional deviation amount acquisition unit. The surface observation positional deviation amount is added to the position where the light reception unit observes reflection of the structured light, and the depth information is calculated again based on the trigonometric method similar to that used in the distance measurement unit 110 to correct the depth information.

Similarly to the first exemplary embodiment, the surface observation positional deviation amount can be interpolated from surface observation positional deviation amounts of points having close positions and orientations. Alternatively, the position and the orientation and the surface observation positional deviation amount of the point may be put into a polynomial or a trigonometric function as parameters to generate a function for returning a correction amount using the position and the orientation of the point as arguments, and the values may be used.

By using the present modification, various cases in which three-dimensional measurement is needed can be handled.

In a third modification of the first exemplary embodiment, the correction amount database used in the depth information correction unit 130 in the first exemplary embodiment is created not by the measurement performed in advance but by a simulation of an optical phenomenon.

In step S0010 in the left flowchart in FIG. 3, by simulating the processes in the depth information calculation performed in the distance measurement unit 110, the correction amount database used in the depth information correction unit 130 is created.

In the simulation, the positions of the light source and the reception unit in the distance measurement unit 110 are known. It is assumed that the pattern of the slit light projected in the light-section method performed by the distance measurement unit 110 is known. Further, it is also assumed that object characteristics such as the shape, the reflectivity, the refractive index, the scattering coefficient, and the absorption coefficient of the measurement target object are known.

Based on these information pieces, it is possible to calculate the light, by the Monte Carlo simulation. The Monte Carlo simulation is a simulation method using random number. The light is the projection pattern light from the light source which is incident on the measurement target object, repeatedly refracted and reflected in the object, emitted from the object surface, and incident on the camera functioning as the light reception unit.

By the processing, with respect to various positions and orientations of the target object, images when the target object on which the structured light is projected is captured by the camera as the light reception unit can be created. Using the created images, the depth information can be calculated using a depth information calculation method based on the trigonometric method similar to that used in the distance measurement unit 110. Accordingly, with respect to an arbitrary point on the target object surface, a difference between positions of the measurement points in a case the simulation of the target object of a semi-transparent object and that of an opaque object are used as the correction amount, and the position and the orientation of the point are registered as keys in the correction amount database.

The computer simulation method is not limited to the Monte Carlo simulation, and any method that can reproduce the optical phenomenon such as subsurface scattering and anisotropic reflection can be employed. For example, an approximation model of modeling single scattering or multiple scattering employed in a fourth modification described below can be used.

The optical phenomenon to be the target in the simulation is not limited to only the light-section method. For example, a spatial coding method, a spot light projection method, and the like used in the distance measurement unit 110 can be simulated. By using the present modification, the time and effort necessary for the measurement performed in advance can be largely reduced.

In the second modification, the case of measuring the surface observation positional deviation amount from the actual measurement data in advance is described. In the fourth modification of the first exemplary embodiment, it is described a case that the surface observation positional deviation amount is calculated by the optical simulation in runtime processing and the values are used without providing the database in advance, in other words, without performing the off-line processing in step S0010 and step S0020.

Except for specular reflection components, the view of a semi-transparent object can be approximately modeled by both of multiple scattering and single scattering (see, Henrik W. Jensen, Stephen R. Marschner, Marc Levoy, and Pat Hanrahan, "A Practical Model for Subsurface Light Transport", SIGGRAPH '01: Proceedings of the 28th annual conference on Computer graphics and interactive techniques, pp. 511-518, 2001). The multiple scattering is a phenomenon in which incident light repeats reflection a plurality of times in an object, and comes out from the object surface. The single scattering is a phenomenon in which incident light reflects once in an object and comes out from the object surface. In the multiple scattering, the incident light isotropically scatters from the incident position as the center, and consequently, the intensity distribution of the reflected light of the light projected on the object becomes gentle. As a result, the observation position deviates little from the light incident position, and the deviation has a little impact on the distance measurement. However, in the single scattering, according to the incident direction and the observation direction of the light, and the refractive index of the object, the position of the structured light captured by the light reception unit is observed at a position deviated from the incident position of the light on the object surface.

To solve the issue, based on the model of the single scattering, the surface observation positional deviation amount is calculated. Since the positions and the orientations of the light source and the camera that functions as the light reception unit are known, an incident direction L of the light from the light source and an observation direction V of the light reception unit are known. It is assumed that a refractive index $\eta$ in the characteristics of the target object is known. Further, the position and the direction of the point for correcting the depth information by the surface information acquisition unit 120 are known. If it is assumed that the point is a locally plane surface, a light path from the light source to the light reception unit in the single scattering can be calculated as follows.

Figure 4:
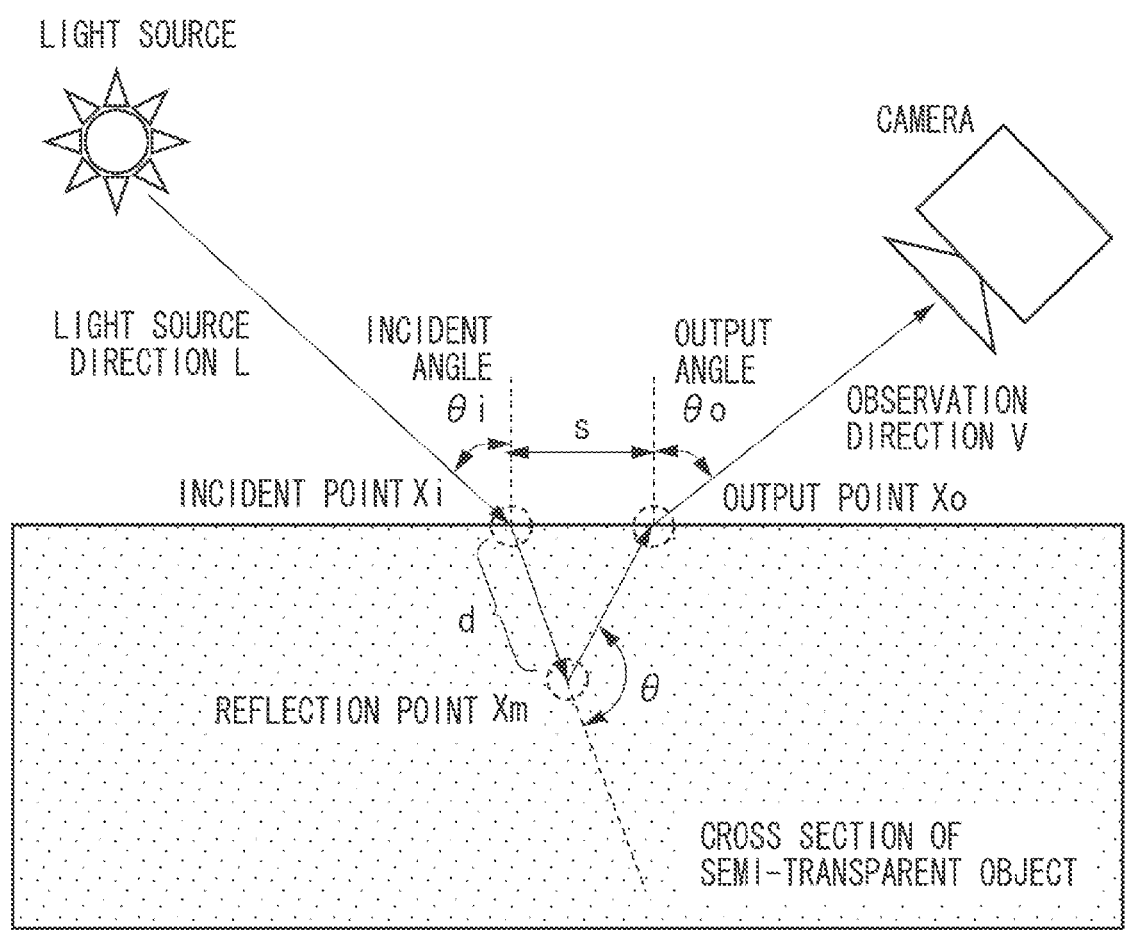
FIG. 4 is a conceptual diagram illustrating a single scattering model.

FIG. 4 is a conceptual diagram illustrating the single scattering model. For the sake of simplicity, it is assumed that the space is a two-dimensional space, however, in a three-dimensional space, the calculation can be similarly performed. In the drawing, if the relative refractive index n of the target object with respect to the air is set, and an incident angle $\theta i$ and an output angle $\theta o$ are acquired from the position and the direction of the target point acquired by the surface information acquisition unit 120, a light source direction L, and an observation direction V. Further, an average distance (mean free path) that the light travels in a straight line without hitting the component material of the target object is set to "d". Then, the distance s between an incident point Xi and an output point Xo of the light with respect to the target object, namely the surface observation positional deviation amount, can be calculated by the following equation 1.

$$s=d\{\sin(\arcsin(\sin(\theta i)/\eta))+\cos(\arcsin(\sin(\theta i)/\eta))\tan(\arcsin(\sin(\theta o)/\eta))\} \quad \text{equation 1}$$

Consequently, a surface observation positional deviation amount acquisition unit in the depth information correction unit 130 in step S1030 acquires the surface observation positional deviation amount using the equation 1. The acquired value is added to the position at which the light reception unit observes reflection of the structured light. Then, the depth information is calculated again based on the trigonometric method similar to that used in the distance measurement unit 110, and the depth information is corrected and output.

The simulation method is not limited to the above-described method, and any method that can reproduce the optical phenomenon of the semi-transparent object can be employed. For example, the method using the Monte Carlo simulation employed in the third modification can be used. In the present modification, while the effort of creating the correction amount database in advance is reduced, the errors in the depth information acquisition can be appropriately corrected, and accurate depth information can be acquired.

In a second exemplary embodiment, different from the first exemplary embodiment, the surface information acquisition unit does not directly calculate the position and direction of the measurement point from the depth information of the target object, but performs calculation by fitting a shape model of the measurement target object to a measurement point group.

Figure 5:
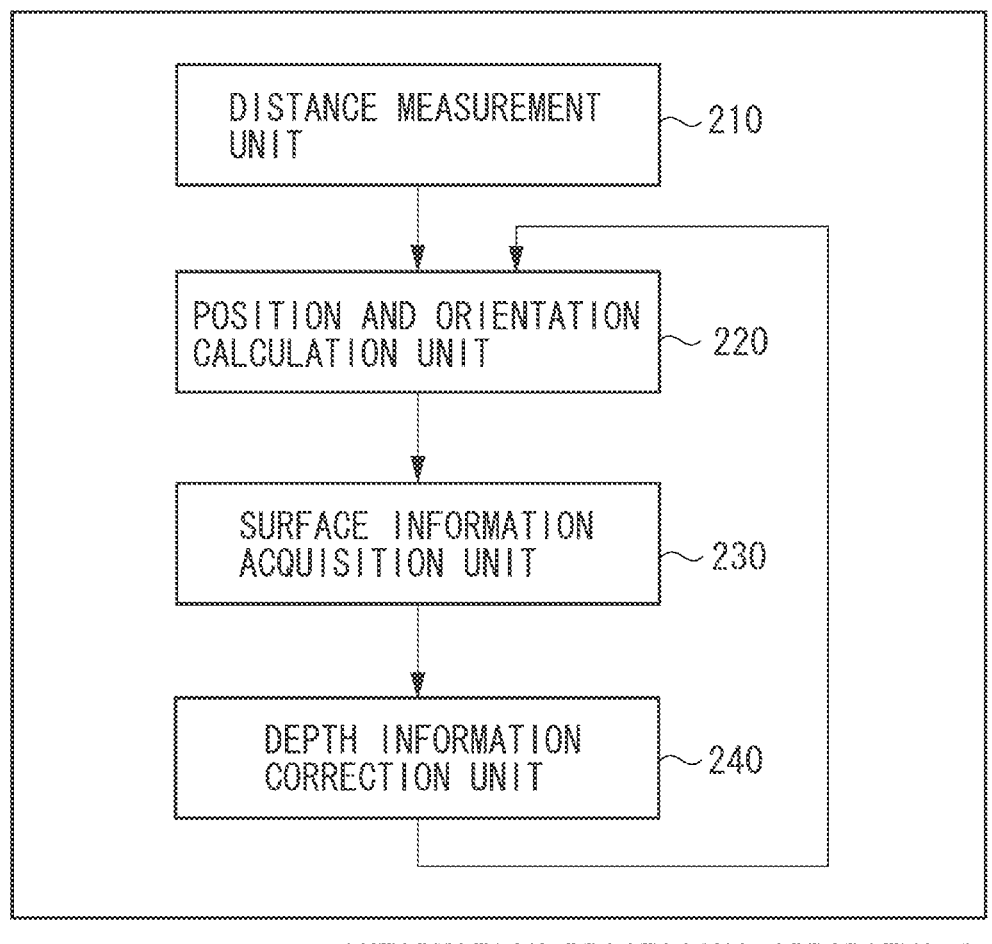
FIG. 5 illustrates a configuration of an information processing apparatus according to a second exemplary embodiment.

FIG. 5 illustrates a configuration of an information processing apparatus 2 according to the present exemplary embodiment. As illustrated in FIG. 5, the information processing apparatus 2 includes a distance measurement unit 210, a position and orientation calculation unit 220, a surface information acquisition unit 230, and a depth information correction unit 240. Hereinafter, the components in the information processing apparatus 2 are described. The distance measurement unit 210 and the depth information correction unit 240 are similar to those in the first exemplary embodiment.

The position and orientation calculation unit 220 estimates a position and an orientation of a target object by fitting a shape model of the target object to the depth information acquired by the distance measurement unit 210, that is, the measured three-dimensional point group. In the model fitting, nearest neighbor search is performed on the correspondence between a measurement point and a surface of the shape model, and a distance in the correspondence is minimized (see the above-described document 1).

The position and orientation calculation method is not limited to the above-described method, and any method capable of calculating a position and an orientation of a target object can be employed. For example, as in Spin Images [in A. E. Johnson and M. Hebert, "Using Spin Images for Efficient Object Recognition in Cluttered 3D Scenes", IEEE Transactions on Pattern Analysis and Machine Intelligence, Vol. 21, No. 5, pp. 433-449, 1999], a position and an orientation of a target object can be calculated by calculating a feature amount from a distance image, matching the feature amount to that calculated from a shape model, and minimizing a distance between the associated feature amounts.

The surface information acquisition unit 230 uses the position and the orientation of the target object acquired by the position and orientation calculation unit 220 to acquire a position and a direction of an arbitrary point on the target object surface. First, the surface information acquisition unit 230 searches a point on the shape model surface corresponding to a measurement point to be corrected in the depth information by nearest neighbor search or a projection method. Then, the surface information acquisition unit 230 outputs the position and the normal line of the found corresponding point on the shape model surface as the point and the direction of the target point. The data is used in the depth information correction unit 240.

Similarly to the first exemplary embodiment, the depth information correction unit 240 uses the position and the direction of the target point acquired by the surface information acquisition unit 230 to correct the depth information measured by the distance measurement unit 210, and outputs the corrected information.

Figure 6:
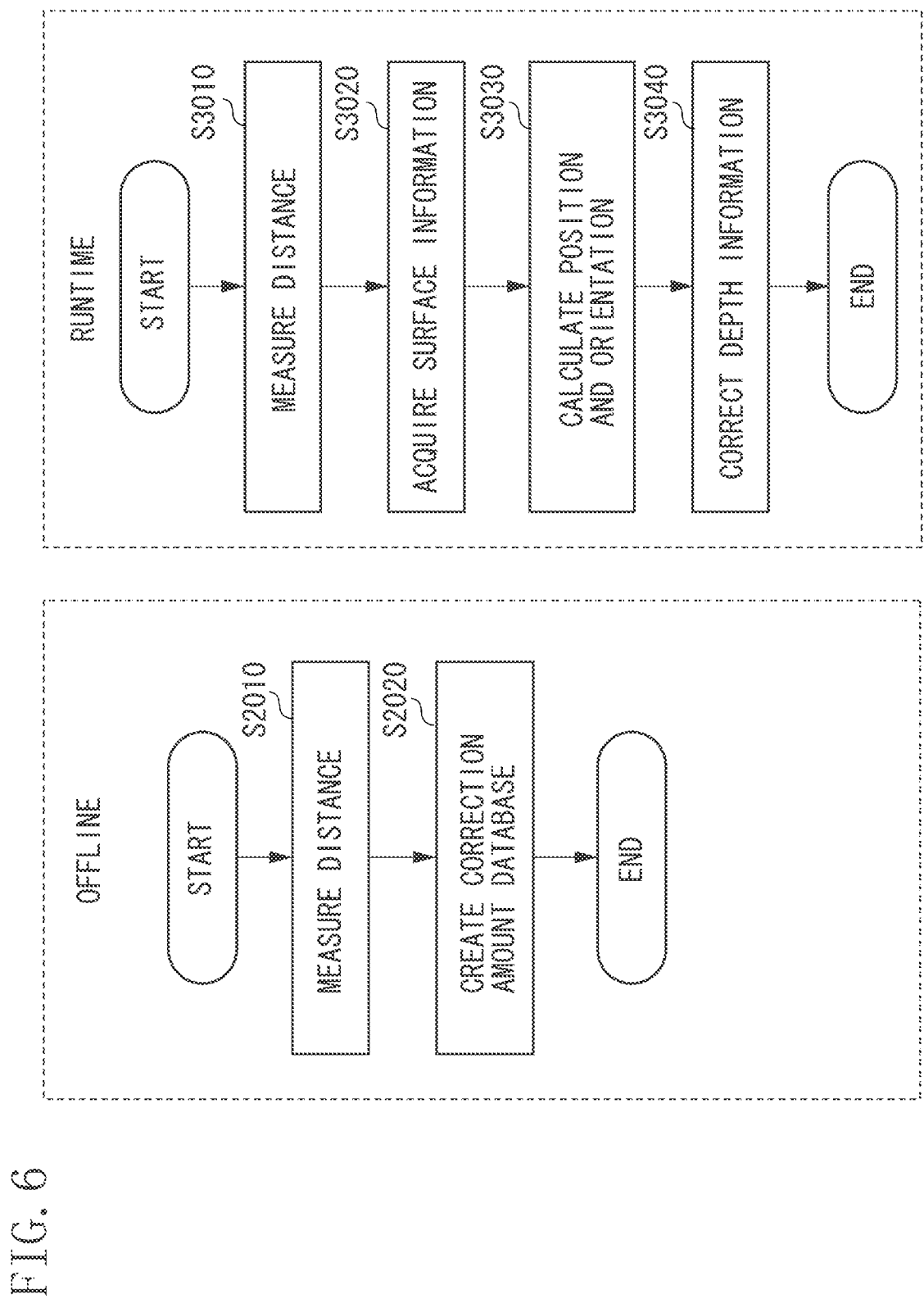
FIG. 6 is a flowchart illustrating a procedure in depth information correction processing according to the second exemplary embodiment.

Hereinafter, the depth information correction method according to the present exemplary embodiment is described with reference to the flowcharts in FIG. 6.

The processing in steps S2010 and S2020 for creating the correction amount database in advance in off-line processing is similar to that in steps S0010 and S0020 in the first exemplary embodiment. The run-time processing for correcting the depth information of the measurement target object is described.

In step S3010, the distance measurement unit 210 measures the depth information of the acquired target object, and transfers the data to the processing in steps S3020 and S3030.

In step S3020, the position and orientation calculation unit 220 estimates the position and the orientation of the target object by fitting the shape model of the target object to the depth information of the target object acquired in step S3010, that is, the measured three-dimensional point group. The position and orientation calculation unit 220 transfers the calculated position and the orientation of the target object to the processing in step S3030.

In step S3030, the surface information acquisition unit 230 calculates a position and a direction of a point on the shape model surface corresponding to the measurement point acquired in step S3010 using the position and the orientation of the target object acquired in step S3020, and transfers the data to the processing in step S3040.

In step S3040, the depth information correction unit 240 corrects the depth information using the position and the direction of the measurement point acquired in step S3030 and the correction amount database, and outputs the data.

Similarly to the first modification in the first exemplary embodiment, the processing in steps S3020, S3030, and S3040 can be repeatedly performed to correct the depth information. In such a case, with respect to the position of the measurement point corrected in step S3040 by the depth information correction unit 240, in step S3020, the position and orientation calculation unit 220 calculates the position and the orientation of the target object again, and in step S3030, the surface information acquisition unit 230 calculates the position and the direction of the measurement point. Then, based on the newly calculated position and direction of the measurement point, in step S3040, the depth information correction unit 240 corrects the depth information of the measurement point, that is, the three-dimensional position of the measurement point. The processing is repeated to correct the depth information until the change in the position and the orientation of the target object calculated by the position and orientation calculation unit 220 in step S3020 will be a value less than or equal to a predetermined threshold.

In the above-described processing, in step S3020, the position and orientation calculation unit 220 calculates the position and the orientation of the measurement target object, and the depth information is corrected and output. However, the output information is not limited to the depth information. Alternatively, the position and the orientation of the measurement target object calculated by the position and orientation calculation unit 220 can be output.

Figure 7:
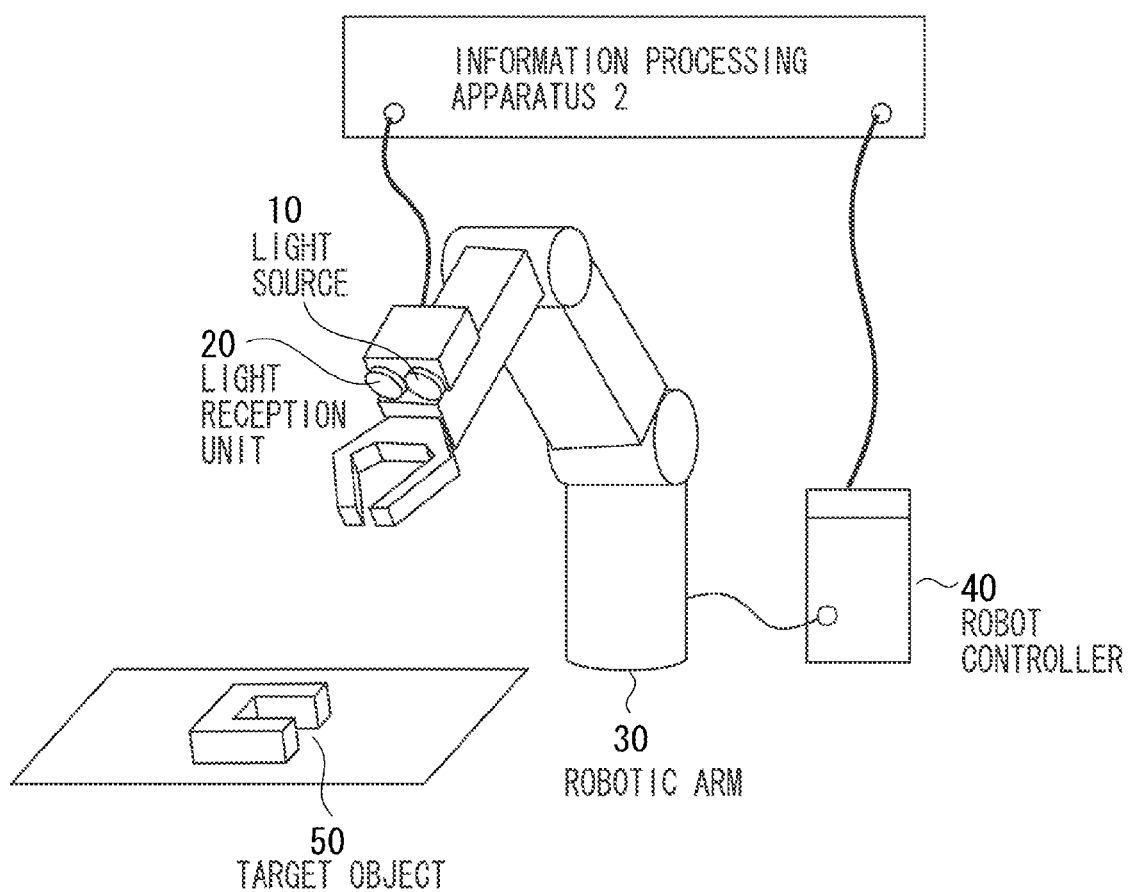
FIG. 7 illustrates a configuration of an information processing apparatus according to a third exemplary embodiment, where the apparatus is used for an operation of a target object by a robotic arm.

An application example of the information processing apparatus 2 described in the second exemplary embodiment includes application to a hand part of a robot arm. The information processing apparatus 2 can be installed to the hand part of the robot arm to measure a position and an orientation of an object held by the hand part as a measurement target object. The application example of the information processing apparatus 2 according to a third exemplary embodiment is described with reference to FIG. 7.

A robotic arm 30 is driven by control of a robot controller 40. The light source 10 and the light reception unit 20 used in the first exemplary embodiment of the present invention are fixed to the robotic arm 30 with a jig, and controlled by the information processing apparatus 2. An operation of the robotic arm. 30 is to pick up a target object 50 using an arm grasping part. The information processing apparatus 2 projects structured light for measurement and captures an image, corrects the depth information using the correction amount database, and sequentially estimates relative positions and orientations of the arm grasping part and the target object 50. The robotic arm 30 is connected by a cable to transmit the estimation result as control parameters of the robot controller 40. By using the estimated position and orientation of the target object 50, the robotic arm 30 grasps the target object 50.

If the position and orientation calculation unit 220 in the information processing apparatus 2 uses a rough position and a rough orientation for model fitting, values to which offsets for the jig are added can be transmitted to the installation position of the industrial robot arm 30 controlled by the robot controller 40. With respect to the shape model used in the model fitting, a computer-aided design (CAD) model of the target object 50 is converted into a format that can be read by the information processing apparatus 2 and input to the shape model. When the target object is changed, a corresponding shape model is input in each time, so that a plurality of kinds of target objects can be handled. In such a case, a shape model stored in the apparatus in advance can be selected, or the stored shape models can be switched using a recognition result of the type of the part by a different parts recognition device.

By performing the processing according to the present exemplary embodiment, the robotic arm 30 can accurately grasp an object that is difficult to be measured, such as a semi-transparent object and an anisotropic reflection object. As a result, precision assembly with the robotic arm 30 can be realized.

According to the first exemplary embodiment, the reflected light of the structured light projected from the light source to a measurement target object such as a semi-transparent object, an anisotropic reflection object, and a specular reflection object is received on the light reception unit. The depth information from the light reception unit to the measurement target object is acquired, using the trigonometric method, from the information of the reflected light. Then, the acquired depth information is corrected based on the position and the direction of the surface of the measurement target object. According to the present exemplary embodiment, errors in the depth information acquisition can be appropriately corrected, and accurate depth information can be acquired. Especially, in the case where the measurement target object largely causes subsurface scattering, anisotropic reflection, specular reflection, or the like, the accuracy in the depth information acquisition can be significantly increased.

In the first modification of the first exemplary embodiment, correction amount databases corresponding to a plurality of objects, materials, thicknesses of the materials, and the like are created in advance. In the run-time processing, the correction amount database is selected according to a target object, the material of the target object, or the thickness of the material of the target object. According to the present modification, the correction amount databases can be shared. As a result, in performing only the run-time processing for correcting the depth information of the target object, the time and effort to create a correction amount database can be reduced.

In the second modification of the first exemplary embodiment, the depth information correction processing is repeatedly performed. According to the present modification, errors in the depth information acquisition can be corrected with a high degree of accuracy, and accurate depth information can be acquired.

In the third modification of the first exemplary embodiment, for the correction amount database, a difference between a position of the structured light incident on the measurement target object surface and a position at which the structured light is observed is registered and used. In the present modification, optical phenomena are more directly modeled, and consequently, optical analysis of the databases can be easily performed. Further, the function approximation of the database can be performed more easily, expression in a low-order function, or further accurate function approximation can be performed.

In the fourth modification of the first exemplary embodiment, the correction amount database is created by simulating an optical phenomenon that causes measurement errors. According to the present modification, the time and effort necessary for the measurement performed in advance can be largely reduced.

In the fifth modification of the first exemplary embodiment, the database is not prepared in advance, a surface observation positional deviation amount is calculated by an optical simulation in the run-time processing, and the calculated amounts are used. According to the present modification, while the time and effort of creating the correction amount database in advance is reduced, the errors in the depth information acquisition can be appropriately corrected, and accurate depth information can be acquired.

In the second exemplary embodiment, a plurality of positions and directions to be calculated from the depth information of the target object are calculated by fitting a shape model of the measurement target object to a measurement point group. According to the present exemplary embodiment, accurate positions and directions of the measurement points can be calculated. Consequently, errors in the depth information acquisition can be corrected with a high degree of accuracy, and accurate depth information can be acquired.

In the third exemplary embodiment, the application example of the present invention, which is applied to a robot arm to grasp a target object, is described. According to the present exemplary embodiment, the robot arm can accurately grasp an object that is difficult to be measured such as a semi-transparent object and an anisotropic reflection object. As a result, the precision assembly with the robotic arm can be realized.

The distance measurement unit according to the present exemplary embodiments of the present invention can be implemented by any method of receiving the structured light projected from the light source by the light reception unit, and measuring a distance using the trigonometric method. The method includes the light-section method described in the first exemplary embodiment, a spatial coding method or a spot light projection method for projecting a plurality of gray code patterns, a grid pattern projection method for projecting a grid pattern, and a multi-slit light projection method in which a reference line pattern is added.

The surface information acquisition unit according to the present exemplary embodiments of the present invention can be implemented by any method capable of calculating the depth information, that is, the position and the direction of the measurement point of a target object measured by the distance measurement unit. As described in the first exemplary embodiment, the measurement value of the position of the measurement point can be directly used, or the direction of the measurement point can be calculated by performing a principal component analysis with respect to the positions of neighbor measurement points, and defining the third main component as the normal line. Alternatively, the direction of the measurement point can be calculated by performing surface fitting with respect to positions of the target measurement point and neighbor measurement points. Alternatively, the position and the direction of the measurement point can be calculated by performing model fitting to a measurement point group.

The depth information correction unit according to the present exemplary embodiments of the present invention can be implemented by any method capable of correcting a three-dimensional position of a measurement point based on the positions of the light source and the light reception unit, and the depth information, that is, the position and the direction of the measurement point. The correction can be implemented using the correction amount database for storing correction amounts corresponding to the positions and the directions of the measurement points crated in advance, or by performing an optical simulation of measurement errors caused by subsurface scattering, anisotropic reflection, specular reflection, or the like using optical characteristic information of the target object. Alternatively, without using the correction amounts themselves, differences between positions of the structured light incident on the surface of the measurement target object and positions at which the structured light is observed can be stored in the database and the values can be used.

The correction amount database can be created by performing measurement in advance, or by performing an optical simulation of measurement errors using optical characteristic information of the target object. Alternatively, correction amount databases corresponding to a plurality of objects, materials, thicknesses of the materials, and the like are created in advance, and according to the target object, the material of the target object, the thickness of the material of the target object, or the like, the correction amount database can be selected and corrected.

Aspects of the present invention can also be realized by a computer of a system or apparatus (or devices such as a central processing unit (CPU), a micro processing unit (MPU), and/or the like) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., a computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-131499 filed Jun. 13, 2011, which is hereby incorporated by reference herein in its entirety.

What is claimed is:

1. An information processing apparatus comprising:
   an acquisition unit configured to acquire a plurality of positions on a surface of a measurement target object using information of light reflected from the measurement target object on which structured light is projected, a position of a light source of the structured light, and a position of a light reception unit configured to receive the reflected light and acquire the information of the reflected light;
   a calculation unit configured to acquire a direction on the surface of the measurement target object based on the plurality of the positions;
   a holding unit configured to hold a correction amount obtained beforehand according to the direction on the surface of the measurement target object;
   an obtaining unit configured to obtain a correction value based on the correction amount held by the holding unit and the direction of the surface of the measurement target object; and
   a correction unit configured to correct at least one of the plurality of the positions based on the obtained correction value.

2. The information processing apparatus according to claim 1, wherein the correction unit corrects at least one of the plurality of positions based on information including at least one of information about subsurface scattering of the measurement target object, information about anisotropic reflection of the measurement target object, and information about specular reflection of the measurement target object.

3. The information processing apparatus according to claim 1, wherein the structured light is at least one of pattern light and slit light.

4. The information processing apparatus according to claim 1, wherein the correction amount is obtained beforehand according to a relative relation among a direction of the light source, a direction of the light reception unit, and the direction on the surface of the measurement target object.

5. The information processing apparatus according to claim 1, wherein the calculation unit acquires at least one of the position and the direction on the surface of the measurement target object by fitting a model of the measurement target object to the plurality of the positions.

6. The information processing apparatus according to claim 1, wherein the correction unit is further configured to acquire information about an error in measurement in the acquisition of the plurality of the positions by a computer simulation.

7. The information processing apparatus according to claim 1, further comprises a measurement unit configured to acquire at least one of the position and an orientation of the measurement target object by fitting a model of the measurement target object to at least one of the plurality of the positions corrected by the correction unit.

8. The information processing apparatus according to claim 1, wherein the correction unit corrects at least one of the plurality of the positions based on a deviation amount between an incident position of the structured light on the measurement target object and an observation position of the reflected light, and at least one of the position and the direction on the surface of the measurement target object.

9. A three-dimensional measurement apparatus comprising:
   a light source;
   a light reception unit; and
   an information processing apparatus according to claim 1.

10. The three-dimensional measurement apparatus according to claim 9, further comprising, a position and orientation operation unit configured to control a robot having a movable axis including at least one of a rotation axis and a translational motion axis, and change a position and an orientation of a target object or the information processing apparatus based on a plurality of positions on a surface of the measurement target object corrected by the correction unit.

11. A method for processing information, the method comprising:
   causing an acquisition unit to acquire a plurality of positions on a surface of a measurement target object using information of light reflected from the measurement target object on which structured light is projected, a position of a light source of the structured light, and a position of a light reception unit configured to receive the reflected light and acquire the information of the reflected light;
   causing a calculation unit to acquire a direction on the surface of the measurement target object based on the plurality of the positions;
   causing a holding unit to hold a correction amount obtained beforehand according to the direction on the surface of the measurement target object;
   causing an obtaining unit to obtain a correction value based on the correction amount held by the holding unit and the direction of the surface of the measurement target object; and
   causing a correction unit to correct at least one of the plurality of the positions based on the obtained correction value.

12. A non-transitory computer-readable storage medium storing a computer program for causing a computer to function as an information processing apparatus, the information processing apparatus comprising:
   an acquisition unit configured to acquire a plurality of positions on a surface of a measurement target object using information of light reflected from the measurement target object on which structured light is projected, a position of a light source of the structured light, and a position of a light reception unit configured to receive the reflected light and acquire the information of the reflected light;

a calculation unit configured to acquire a direction on the surface of the measurement target object based on the plurality of the positions;

a holding unit configured to hold a correction amount obtained beforehand according to the direction on the surface of the measurement target object;

an obtaining unit configured to obtain a correction value based on the correction amount held by the holding unit and the direction of the surface of the measurement target object; and a correction unit configured to correct at least one of the plurality of the positions based on the obtained correction value.

13. An information processing apparatus comprising:

an acquisition unit configured to acquire a plurality of positions on a surface of a measurement target object using information of light reflected from the measurement target object on which structured light is projected, a position of a light source of the structured light, and a position of a light reception unit configured to receive the reflected light and acquire the information of the reflected light;

a calculation unit configured to acquire at least one of a position and a direction on the surface of the measurement target object based on the plurality of the positions; and a correction unit configured to correct at least one of the plurality of the positions based on information about an error in measurement for acquiring the plurality of the positions and at least one of the position and the direction on the surface of the measurement target object, wherein the correction unit corrects at least one of the plurality of the positions based on a deviation amount between an incident position of the structured light on the measurement target object and an observation position of the reflected light, and at least one of the position and the direction on the surface of the measurement target object.

14. A method for processing information, the method comprising:

causing an acquisition unit to acquire a plurality of positions on a surface of a measurement target object using information of light reflected from the measurement target object on which structured light is projected, a position of a light source of the structured light, and a position of a light reception unit configured to receive the reflected light and acquire the information of the reflected light;

causing a calculation unit to acquire at least one of a position and a direction on the surface of the measurement target object based on the plurality of the positions; and causing a correction unit to correct at least one of the plurality of the positions based on information about an error in measurement for acquiring the plurality of the positions and at least one of the position and the direction on the surface of the measurement target object, wherein the correction unit corrects at least one of the plurality of the positions based on a deviation amount between an incident position of the structured light on the measurement target object and an observation position of the reflected light, and at least one of the position and the direction on the surface of the measurement target object.

15. A non-transitory computer-readable storage medium storing a computer program for causing a computer to function as an information processing apparatus, the information processing apparatus comprising:

an acquisition unit configured to acquire a plurality of positions on a surface of a measurement target object using information of light reflected from the measurement target object on which structured light is projected, a position of a light source of the structured light, and a position of a light reception unit configured to receive the reflected light and acquire the information of the reflected light;

a calculation unit configured to acquire at least one of a position and a direction on the surface of the measurement target object based on the plurality of the positions; and a correction unit configured to correct at least one of the plurality of the positions based on information about an error in measurement for acquiring the plurality of the positions and at least one of the position and the direction on the surface of the measurement target object, wherein the correction unit corrects at least one of the plurality of the positions based on a deviation amount between an incident position of the structured light on the measurement target object and an observation position of the reflected light, and at least one of the position and the direction on the surface of the measurement target object.

* * * * *